United States Patent [19]

Watanabe et al.

[11] Patent Number: 5,364,899

[45] Date of Patent: Nov. 15, 1994

[54] FLAME-RETARDANT RESIN COMPOSITION

[75] Inventors: Jyun Watanabe; Noriak Kudo, both of Machida, Japan

[73] Assignee: Denki Kagaku Koguo Kabushiki Kaisha, Tokyo, Japan

[21] Appl. No.: 7,719

[22] Filed: Jan. 22, 1993

[30] Foreign Application Priority Data

| Jan. 24, 1992 | [JP] | Japan | 4-032823 |
| Jul. 2, 1992 | [JP] | Japan | 4-197505 |
| Jul. 3, 1992 | [JP] | Japan | 4-198930 |
| Aug. 21, 1992 | [JP] | Japan | 4-223037 |

[51] Int. Cl.$^5$ .......................... C08K 5/54; C08K 5/09
[52] U.S. Cl. ................................ 524/268; 524/400
[58] Field of Search ............ 525/146, 464; 524/112, 524/493, 494, 611, 399, 400, 268

[56] References Cited

U.S. PATENT DOCUMENTS

| 2,999,835 | 9/1961 | Goldberg | 525/464 |
| 3,424,703 | 1/1969 | Jones | 524/611 |
| 3,475,372 | 10/1969 | Gable | 524/611 |
| 3,488,317 | 1/1970 | Hechelhammer et al. | 524/611 |
| 3,535,300 | 10/1970 | Gable | 252/609 |
| 3,651,174 | 3/1972 | Bialous | 525/464 |
| 3,666,510 | 5/1972 | Coaker et al. | 524/112 |
| 3,971,756 | 7/1976 | Bialous et al. | 525/464 |
| 4,147,707 | 4/1979 | Alewelt et al. | 524/611 |
| 4,312,803 | 1/1982 | Markezich et al. | 524/611 |
| 4,313,873 | 2/1982 | Lim | 524/399 |
| 4,826,900 | 5/1989 | Ogoe et al. | |
| 4,857,593 | 8/1989 | Leung et al. | 525/464 |
| 5,061,745 | 10/1991 | Wittmann et al. | |

FOREIGN PATENT DOCUMENTS

| 52-90557 | 7/1977 | Japan . |
| 57-8244 | 1/1982 | Japan . |
| 0314865 | 1/1991 | Japan . |
| 1459648 | 12/1976 | United Kingdom . |

OTHER PUBLICATIONS

Menachem Lewin et al–Flame-Retardant *Polymeric Materials*–pp. 1–9, 15–17 and 440–447 (1975).

*Primary Examiner*—Veronica P. Hoke
*Attorney, Agent, or Firm*—Oblon, Spivak, McClelland, Maier & Neustadt

[57] ABSTRACT

A flame-retardant resin composition comprising the following components:
(A) 100 parts by weight of a polycarbonate resin,
(B) from 0.0001 to 1 part by weight of a salt of a carboxylic acid with zinc,
(C) at least one member selected from the group consisting of from 1 to 200 parts by weight of a filler, from 0.01 to 5 parts by weight of a fluorine-containing resin and from 0.01 to 5 parts by weight of a silicone.

8 Claims, No Drawings

150
FLAME-RETARDANT RESIN COMPOSITION

BACKGROUND OF THE INVENTION

1. Field of the Invention

The present invention relates to a flame-retardant resin composition. More particularly, it relates to a flame-retardant resin composition having a flame-retardant comprising a zinc salt of a carboxylic acid incorporated to a polycarbonate resin.

2. Discussion of Background

By virtue of their excellent mechanical properties and thermal characteristics, polycarbonate resins are widely used industrially in the automobiles field, the office appliances field, the electronic and electrical field, etc. On the other hand, in recent years, there has been a strong demand for flame-retardancy, especially, of resin materials to be used in the applications to office appliances and house-hold electrical appliances. To meet such a demand, many flame retardants have been developed and being studied. Heretofore, for flame-retardancy of polycarbonate resins, chlorine- or bromine-containing compounds have been mainly used, and in many cases, antimony trioxide or the like has been used as a flame-retarding assistant in combination with such flame-retardants.

When a chlorine- or bromine-containing compound is used for flame-retardancy, the flame-retarding effect is relatively high, but noxious or hazardous substances will be produced during the incineration treatment or at the outbreak of fire, whereby emergency activities or fire extinguishing activities will be difficult, or an environmental pollution is likely to be brought about. Further, the chlorine- or bromine-containing compound has a problem that the heat stability is not adequate, and the mechanical properties tend to deteriorate by the heat history during the molding operation. Therefore, it is desired to develop a flame-retardant resin which contains no such chlorine- or bromine-containing compound or which has a relatively small content of such a chlorine- or bromine-containing compound.

It is an object of the present invention to solve such problems of the prior art and to provide a flame-retardant resin composition having excellent flame-retardancy.

Japanese Unexamined Patent Publication No. 90557/1977 discloses a thermally stable composition comprising an aromatic polycarbonate, a $C_{1-24}$ carboxylic acid (non-anhydride) and a salt of a $C_{1-24}$ carboxylic acid with a metal of Group II in the periodic table. However, this publication discloses nothing about a flame-retarding effect, although it discloses improvement of the thermal stability. Namely, this publication teaches nothing about improvement of the flame-retardancy by the use of a salt of a carboxylic acid with zinc.

SUMMARY OF THE INVENTION

The present inventors have conducted extensive researches to improve the flame-retardancy of a polycarbonate resin by a flame-retardant which contains substantially no chlorine or bromine, and as a result, have found that an excellent flame-retarding effect can be obtained by incorporating a zinc salt of a carboxylic acid and at least one member selected from the group consisting of a filler, a fluorine-containing resin and a silicone. The present invention has been accomplished on the basis of this discovery.

Thus, the present invention provides a flame-retardant resin composition comprising the following components:

(A) 100 parts by weight of a polycarbonate resin,
(B) from 0.0001 to 1 part by weight of a salt of a carboxylic acid with zinc,
(C) at least one member selected from the group consisting of from 1 to 200 parts by weight of a filler, from 0.01 to 5 parts by weight of a fluorine-containing resin and from 0.01 to 5 parts by weight of a silicone.

DETAILED DESCRIPTION OF THE PREFERRED EMBODIMENTS

The polycarbonate resin to be used in the present invention, is the one produced by reacting a bivalent phenol and a carbonate precursor by a solution method or a melting method. Typical examples of the bivalent phenol include 2,2-bis(4-hydroxyphenyl)propane (bisphenol A), bis(4-hydroxyphenyl)methane, 1,1-bis(4-hydroxyphenyl)ethane, 2,2-bis(4-hydroxy-3,5-dimethylphenyl)propane, 2,2-bis(4-hydroxy-3-methylphenyl)propane, bis(4-hydroxyphenyl)sulfide, and bis(4-hydroxyphenyl)sulfone. A preferred bifunctional phenol is a bis(4-hydroxyphenyl)alkane, particularly bisphenol A as the main material. The carbonate precursor may be a carbonyl halide, a carbonyl ester or a haloformate. Specifically, it includes phosgene, diphenyl carbonate, dimethyl carbonate, a dihaloformate of a bivalent phenol and a mixture thereof.

For the preparation of a polycarbonate resin, at least one member selected from these bivalent phenols can be used. Further, two or more polycarbonate resins thus obtained may be used in combination as a mixture. In the present invention, it is preferred to use a polycarbonate containing no halogen.

The salt of a carboxylic acid with zinc to be used in the present invention is the one wherein the carboxylic acid component is represented by the formula $R(COOH)_n$ wherein R is hydrogen or a $C_{1-40}$ hydrocarbon group, and n is an integer of at least 1. In this salt of a carboxylic acid with zinc, a free carboxyl group may be present, and the salt preferably contains no halogen component.

Preferred examples of the salt of a carboxylic acid with zinc include zinc formate, zinc acetate, zinc propionate, zinc butyrate, zinc valerate, zinc hexanoate, zinc octanoate, zinc dodecanoate, zinc laurate, zinc myristate, zinc palmitate, zinc stearate, zinc oxalate, zinc malonate, zinc succinate, zinc glutarate, zinc adipate, zinc pimelate, zinc suberate, zinc acelate, zinc sebacate, zinc acrylate, zinc methacrylate, zinc crotonate, zinc oleate, zinc fumarate, zinc maleate, zinc benzoate, zinc phthalate and zinc cinnamate.

These zinc salts may be used alone or in combination as a mixture of two or more of them. In the present invention, it is preferred to use zinc formate, zinc acetate, zinc propionate, zinc stearate, zinc valerate, zinc hexanoate or zinc benzoate. More preferably, zinc acetate is employed.

There is no particular restriction as to the amount of such a metal salt. However, it is preferably within a range of from 0.0001 to 1 part by weight per 100 parts by weight of component (A). More preferably, it is within a range of from 0.0001 to 0.1 part by weight per 100 parts by weight of component (A). If the amount is less than this range, no adequate flame-retarding effect can be obtained. On the other hand, if the amount exceeds this range, there will be a drawback such that decomposition of the polycarbonate resin will be accelerated.

Dripping of a molten resin when a resin is burned, is a phenomenon undesirable from the viewpoint of fire prevention. For the purpose of preventing such dripping of a resin, the filler, the fluorine-containing resin and the silicone used in the present invention, are all effective when employed in combination with the zinc salt of a carboxylic acid.

The fluorine-containing resin useful in the present invention may, for example, be polytetrafluoroethylene, a tetrafluoroethylene-hexafluoropropylene copolymer, a tetrafluoroethylene-perfluoroalkylvinyl ether copolymer, a tetrafluoroethylene-ethylene copolymer, polytrifluorochloroethylene or polyvinylidene fluoride. These fluorine-containing resins may be used alone or in combination as a mixture of two or more of them. The fluorine-containing resins may be in any form such as emulsion, suspension, microfibril, powder or granular form. In the present invention, it is preferred to employ polytetrafluoroethylene.

The silicone useful in the present invention, is not particularly limited, so long as it has a

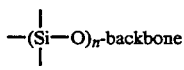

in its molecular structure. Specific examples of the silicone useful in the present invention include polydimethylsiloxane, polymethylphenylsiloxane, amino-modified silicone, mercapto-modified silicone and epoxy-modified silicone. These silicones may be used alone or in combination as a mixture of two or more of them. Further, such a silicone may have a wide range of a molecular weight from a few hundreds to a few millions, and it may be in any form such as oil, varnish, gum or resin form. In the present invention, it is preferred to employ polydimethylsiloxane.

When the silicone and the fluorine-containing resin are employed in the present invention, their amounts are usually within a range of from 0.01 to 5 parts by weight per 100 parts by weight of the resin component. If the amounts of the silicone and the fluorine-containing resin exceed 5 parts by weight, the resulting resin composition may bring about a defective phenomenon such as an inferior appearance of a molded product or an increase of the melt viscosity.

To the flame-retardant resin composition of the present invention, a filler may be incorporated for the purpose of improving e.g. the mechanical properties and thermal characteristics as well as for the purpose of preventing dripping of the resin. The filler is not particularly limited, so long as it is the one commonly used as a filler for a resin.

Such a filler may, for example, be a fibrous filler such as glass fibers, asbestos, carbon fibers, aromatic polyamide fibers, potassium titanate whisker fibers, metal fibers, ceramic fibers or boron whisker fibers, or a powdery, granular or plate-shaped inorganic filler such as mica, silica, talc, clay, calcium carbonate, glass beads, glass balloons or glass flakes. These fillers may be used alone or in combination as a mixture of two or more of them. Further, such a filler may have been treated with a surface treating agent such as a sizing agent, a coupling agent or the like. Among them, a fibrous filler is preferably employed. More preferably, glass fibers are employed.

The filler is effective for prevention of the dripping of the resin and for improving the mechanical properties or thermal characteristics of the resin. To obtain the function for preventing the dripping, the filler is used in an amount of from 1 to 50 parts by weight per 100 parts by weight of the resin component. Further, in order to impart the mechanical properties or thermal characteristics to the resin, the filler is increased within a range of up to 200 parts by weight per 100 parts by weight of the resin component. If the filler is used solely for improving the mechanical properties or thermal characteristics while leaving the function for preventing the dripping to the fluorine-containing resin or to the silicone in an amount of from 0.01 to 5 parts by weight per 100 parts by weight of the resin, the amount of the filler may be determined within a range of from 1 to 200 parts by weight, preferably from 1 to 100 parts by weight, per 100 parts by weight of the resin. If the filler is used in an amount exceeding 200 parts by weight, the moldability of the resin composition will be impaired.

In the present invention, a carboxylic acid can be used as a stabilizer to prevent a decrease of the molecular weight of the polycarbonate of the resin component when the flame-retardant resin composition is subjected to heat history e.g. by molding operation. The carboxylic acid to be used, is not particularly limited, but is preferably a carboxylic acid having an acid anhydride structure. More preferably, it is an aromatic carboxylic acid having an acid anhydride structure.

Specific examples of the carboxylic acid include maleic anhydride, phthalic anhydride, itaconic anhydride, trimellitic anhydride, pyromellitic anhydride, cyclopentanedicarboxylic anhydride, benzophenonetetracarboxylic anhydride, norbornane 2,3-dicarboxylic anhydride, methyl hymic anhydride and a styrene-maleic anhydride copolymer.

The amount of the compound having a dicarboxylic anhydride structure is usually within a range of from 0.001 to 3 parts by weight, preferably from 0.01 to 1 part by weight, per 100 parts by weight of the resin component. If the amount is less than 0.001 part by weight, no adequate effect for heat stability can be obtained. On the other hand, if the amount exceeds 3 parts by weight, no additional effect will be obtained.

In the present invention, in addition to the polycarbonate resin, other resin may be incorporated to such an extent not to impair the flame-retardancy, as the case requires. Typical examples of such an additional resin include a polystyrene resin (PS), an acrylonitrile-styrene copolymer (SAN), an acrylonitrile-butadiene-styrene resin (ABS), a polyester resin (PBT or PET) as well as a (modified)polyethylene, a (modified)polypropylene, a (modified)ethylene-propylene copolymer resin, a polyphenylene ether, a polyamide, a polyacetal, a polymethyl methacrylate, a styrene/maleic anhydride copolymer resin, a styrene/N-phenylmaleimide/maleic anhydride copolymer resin, a styrene/N-phenylmaleimide/acrylonitrile copolymer resin and a styrene/N-phenylmaleimide copolymer resin. Further, two or more of these resins may be used in combination. Now, an ABS resin among them will be described in further detail.

The ABS resin to be used in the present invention is a graft polymer obtained by graft polymerizing a vinyl monomer containing an aromatic vinyl monomer to a elastomer. It further covers a blend product of such a graft polymer with a polymer obtained by polymerizing a vinyl monomer containing an aromatic vinyl monomer.

The graft polymer is prepared by graft polymerizing an aromatic vinyl monomer and at least one monomer selected from the group consisting of (meth)acrylonitrile, a (meth)acrylic acid ester, a maleimide monomer and an unsaturated dicarboxylic anhydride monomer, to an elastomer having a glass transition temperature of not higher than 10° C. The aromatic vinyl monomer may, for example, be styrene, α-methylstyrene, a methyl-substituted styrene, t-butylstyrene, hydroxystyrene or a halostyrene. The (meth)acrylic acid ester may, for example, be methyl acrylate, ethyl acrylate, methyl methacrylate or ethyl methacrylate. The maleimide monomer may, for example, be maleimide, N-methylmaleimide, N-ethylmaleimide, N-propylmaleimide, N-hexylmaleimide, N-cyclohexylmaleimide or N-phenylmaleimide. The unsaturated dicarboxylic acid anhydride monomer may, for example, be maleic anhydride. These monomers may also be used in combination as a mixture of two or more of them. The monomers which are preferably used for the graft polymer to be used in the present invention, are styrene, and acrylonitrile and/or methyl methacrylate. There is no particular restriction as to the method for preparing the graft polymer. A conventional method such as bulk polymerization, solution polymerization, suspension polymerization or emulsion polymerization may be used. Specific examples of the elastomer to be used for the graft polymer include polybutadiene, a butadiene-styrene copolymer, a butadiene-styrene block copolymer, a hydrogenated butadiene-styrene block copolymer, a butadiene-acrylonitrile copolymer, an acrylic rubber, an ethylenepropylene (diene component) copolymer, an isobutyleneisoprene copolymer, a styrene-isoprene block copolymer, a hydrogenated styrene-isoprene block copolymer, a polyurethane rubber, a polyamide rubber and a silicone rubber. In the present invention, it is preferred to employ polybutadiene, a butadiene-styrene copolymer, an acrylic rubber, an ethylene-propylene (diene component) copolymer or a silicone rubber.

The polymer to be blended with the graft polymer may be a polymer obtained by polymerizing the monomer which is used for the above graft polymerization. Preferred as such a polymer is, for example, an α-methylstyrene/acrylonitrile copolymer, a styrene/acrylonitrile copolymer, an α-methylstyrene/methyl methacrylate copolymer, a styrene/methyl methacrylate copolymer an α-methylstyrene/acrylonitrile/N-phenylmaleimide copolymer, a styrene/acrylonitrile/N-phenylmaleimide copolymer or a styrene/N-phenylmaleimide/maleic anhydride copolymer. These polymers may be used alone or in combination as a mixture of two or more of them. There is no particular restriction as to the method for preparing such polymers, and a conventional method such as bulk polymerization, solution polymerization, suspension polymerization or emulsion polymerization may be employed.

When a polymer blend comprising a polycarbonate resin and a non-polycarbonate resin, is used in the present invention, the weight ratio of the polycarbonate resin to the non-polycarbonate resin is preferably within a range of from 50/50 to 99/1, more preferably from 60/40 to 95/5. If the proportion of the non-polycarbonate resin exceeds a weight ratio of 50, properties of the flame-retardant resin such as the flame-retardancy, the mechanical properties or the heat characteristics may sometimes be impaired.

The phosphoric acid ester and/or the phosphorous acid ester to be used in the present invention is a compound of the formula (I) and/or a condensation product thereof:

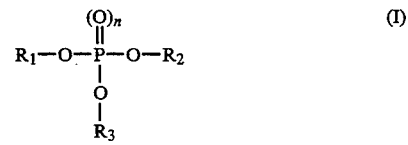

wherein each of $R_1$, $R_2$ and $R_3$ which are independent of one another, is a $C_1$–$C_{20}$ hydrocarbon group or hydrogen, and n is 0 or 1.

The phosphoric acid ester includes, for example, trimethyl phosphate, triethyl phosphate, tributyl phosphate, tri(2-ethylhexyl)phosphate, tributoxyethyl phosphate, trioleyl phosphate, triphenyl phosphate, tricresyl phosphate, trixylenyl phosphate, tris(isopropylphenyl) phosphate, tris(o-phenylphenyl) phosphate, tris(p-phenylphenyl) phosphate, trinaphthyl phosphate, cresyldiphenyl phosphate, xylenyldiphenyl phosphate, diphenyl(2-ethylhexyl) phosphate, di(isopropylphenyl) phenyl phosphate, o-phenylphenyldicresyl phosphate, dibutyl phosphate, monobutyl phosphate, di-2-ethylhexyl phosphate, monoisodecyl phosphate, 2-acryloyloxyethylacid phosphate, 2-methacryloyloxyethylacid phosphate, diphenyl-2-acryloyloxyethyl phosphate, diphenyl-2-methacryloyloxyethyl phosphate and condensation products thereof.

The phosphorous acid ester includes, for example, trimethyl phosphite, triethyl phosphite, tributyl phosphite, tri(2-ethylhexyl) phosphite, tributoxyethyl phosphite, trioleyl phosphite, triphenyl phosphite, tricresyl phosphite, trixylenyl phosphite, tris(isopropylphenyl) phosphite, trisnonylphenyl phosphite, tris(o-phenylphenyl) phosphite, tris(p-phenylphenyl) phosphite, trinaphthyl phosphite, cresyldiphenyl phosphite, xylenyldiphenyl phosphite, diphenyl(2-ethylhexyl) phosphite, di(isopropylphenyl)phenyl phosphite, o-phenylphenyldicresyl phosphite, dibutyl phosphite, monobutyl phosphite, di-2-ethylhexyl phosphite, monoisodecyl phosphite and condensation products thereof.

These phosphoric acid esters and/or phosphorous acid esters may be used alone or in combination as a mixture of two or more of them.

The amount of such a phosphoric acid ester and/or a phosphorous acid ester to be incorporated, is not particularly limited, but it is preferably within a range of from 1 to 30 parts by weight, more preferably from 5 to 20 parts by weight, per 100 parts by weight of the polycarbonate resin. If the amount is less than 1 part by weight, no adequate flame-retarding effect can be obtained, and if the amount exceeds 30 parts by weight, there will be a drawback such that the heat resistance of the resulting composition substantially decreases or a volatile component during the molding operation increases.

The flame-retardant resin composition of the present invention exhibits an excellent flame-retarding effect without using a bromine- or chlorine-containing compound as the flame-retarding component. However, a conventional flame-retarding additive commonly used, may be incorporated. Such a flame-retarding additive is not particularly limited so long as it provides a flame-retarding effect. For example, a flame-retarding additive such as red phosphorus, a chlorine- or bromine-containing compound, an antimony compound, a nitrogen compound, a heat expansive graphite, a metal oxide, a metal hydroxide, a polynucleus-substituted hydroxystyrene, a guanamine resin, a phenol resin, a melamine resin or a urea resin, may be used. These flame-retarding additives may be used alone or in combination as a mixture of two or more of them.

There is no particular restriction as to the method of mixing the resin and the flame-retardant, and any means may be employed so long as it is capable of uniformly mixing them. For example, it is possible to employ mixing or kneading by means of various mixing machines such as an extruder, a Henshel mixer, a Banbury mixer, a kneader and heat rolls.

At that time, various additives may be incorporated as the case requires, to such an extent not to impair the flame-retardancy. Specific examples of such additives include a releasing agent, a lubricant, a plasticizer, a ultraviolet absorber, a light stabilizer, an antioxidant, a heat resistant stabilizer, an anti-aging agent, and a dye or pigment.

Further, in order to improve the properties of the polymer blend, conventional impact strength improving materials or compatibilizing components may also be incorporated.

Now, the present invention will be described in further detail with reference to Examples. However, it should be understood that the present invention is by no means restricted by such specific Examples.

EXAMPLES 1 to 25 and COMPARATIVE EXAMPLES 1 to 19

To 100 parts by weight of a polycarbonate, the components as identified in Tables 1 to 3 were mixed in the proportions as identified in Tables 1 to 3 by means of a Henshel mixer, and the mixture was melt-kneaded and extruded at a temperature of 280° C. by means of a twin screw extruder of 30 mm in diameter (PCM-30, manufactured by Ikegai Tekko K.K.) and pelletized by a pelletizer.

For the UL flammability test, the obtained pellets were thoroughly dried and then injection-molded to obtain a flammability test piece of 127 mm×12.7 mm×1.6 mm, and the flame-retardancy of the resin composition was measured in accordance with Subject 94 (UL-94) by Underwriters Laboratory, U.S.A.

With respect to the heat stability, the obtained pellets were thoroughly dried, then maintained at 280° C. for 3 minutes, thereafter quickly taken out in the form of a strand and cooled to room temperature to give heat history. A test piece thus obtained was evaluated by measuring the Izod impact strength and the molecular weight of the polycarbonate component.

The molecular weight of the polycarbonate was measured by means of a gel permeation chromatography HLC-8020, manufactured by TOSOH CORPORATION using 2 columns of GMHxl and one column of G2000 and chloroform as a carrier solvent on the basis of polystyrene. The Izod impact strength was measured in accordance with JIS K-7110 with respect to a notched test piece with a width of 3.2 mm.

The deflection temperature under load was measured in accordance with method A of JIS K7207.

The results are shown in Tables 1 to 3. The values in Table 2 are obtained using the test pieces molded from the pellets after the heat stability test mentioned above.

The symbols used in the following Tables are as follows.

PC: Polycarbonate resin (NOVAREX 7030PJ, manufactured by Mitsubishi Kasei Corporation)
ABS: ABS resin (GR-3000, manufactured by Denki Kagaku Kogyo K.K.)
TPP: Triphenyl phosphate (TPP manufactured by Daihachi Kagaku Kogyosho K.K.)
PTFE: polytetrafluoroethylene (Teflon 6J, manufactured by Mitsui Du Pont Fluorochemical K.K.)
PDMS: Polydimethylsiloxane (TSF451-1000, manufactured by Toshiba Silicone K.K.)
Izod: Izod impact strength (in accordance with JIS K-7110)
HDT: Deflection temperature under load (in accordance with JIS K7207)

TABLE 1

| | PC/ABS (parts by weight) | Metal salt (parts by weight) | GF/PTFE/PDMS (parts by weight) | Carboxylic acid (parts by weight) | Phosphoric acid ester (parts by weight) | Flame-retardancy UL-94 | Mn $10^4$ | Izod (kg-cm/cm) | HDT (°C.) |
|---|---|---|---|---|---|---|---|---|---|
| Example 1 | 100/— | Zinc acetate 0.01 | 30/—/— | — | — | V-0 | — | — | — |
| Example 2 | 100/— | Zinc acetate 0.001 | 30/—/— | — | — | V-0 | — | — | — |
| Example 3 | 100/— | Zinc acetate 0.001 | —/0.2/— | — | — | V-0 | — | — | — |
| Example 4 | 100/— | Zinc acetate 0.001 | 20/0.2/— | — | — | V-0 | — | — | — |
| Example 5 | 100/— | Zinc acetate 0.1 | 30/—/1.0 | — | — | V-0 | — | — | — |
| Example 6 | 100/— | Zinc stearate 0.004 | 30/—/— | — | — | V-0 | — | — | — |
| Example 7 | 100/— | Zinc propionate 0.004 | 30/—/— | — | — | V-0 | — | — | — |
| Example 8 | 100/— | Zinc benzoate 0.02 | 30/—/— | — | — | V-0 | — | — | — |
| Comparative Example 1 | 100/— | — | —/—/— | — | — | V-2 | — | 85 | 134 |
| Comparative Example 2 | 100/— | — | 30/—/— | — | — | V-2 | 2.69 | 15.2 | — |
| Comparative Example 3 | 100/— | — | —/—/1.0 | — | — | V-2 | — | — | — |
| Comparative Example 4 | 100/— | — | —/0.2/— | — | — | V-1 | — | — | — |

TABLE 2

| | PC/ABS (parts by weight) | Metal salt (parts by weight) | GF/PTFE/PDMS (parts by weight) | Carboxylic acid (parts by weight) | Phosphoric acid ester (parts by weight) | Flame-retardancy UL-94 | Mn $10^4$ | Izod (kg-cm/cm) | HDT (°C.) |
|---|---|---|---|---|---|---|---|---|---|
| Example 9 | 100/— | Zinc acetate 0.01 | 30/—/— | Pyromellitic 0.3 anhydride | — | V-0 | 2.65 | 14.1 | — |
| Example 10 | 100/— | Zinc acetate 0.001 | 30/—/— | Methylhymic 0.3 anhydride | — | V-0 | 2.77 | 14.4 | — |
| Example 11 | 100/— | Zinc acetate 0.001 | —/0.2/— | Trimellitic 0.3 anhydride | — | V-0 | 2.69 | 13.9 | — |
| Example 12 | 100/— | Zinc acetate 0.001 | 20/—/2 | Pyromellitic 0.3 anhydride | — | V-0 | 2.72 | 14.2 | — |
| Example 13 | 100/— | Zinc acetate 0.001 | 30/0.2/— | Trimellitic 0.3 anhydride | — | V-0 | 2.65 | 13.6 | — |
| Example 14 | 100/— | Zinc stearate 0.004 | 30/—/— | Trimellitic 0.3 anhydride | — | V-0 | 2.74 | 15.0 | — |
| Example 15 | 100/— | Zinc benzoate 0.001 | 30/—/— | Methylhymic 0.3 anhydride | — | V-0 | 2.75 | 14.3 | — |
| Example 16 | 100/— | Zinc acetate 0.001 | 30/—/— | Maleic 0.3 anhydride | — | V-0 | 2.71 | 14.7 | — |
| Comparative Example 5 | 100/— | Zinc acetate 0.001 | 30/—/— | — | — | V-0 | 1.66 | 4.6 | — |
| Comparative Example 6 | 100/— | Zinc acetate 0.001 | —/0.2/— | — | — | V-0 | 1.54 | 3.2 | — |
| Comparative Example 7 | 100/— | Zinc acetate 0.001 | 20/—/2.0 | — | — | V-0 | 1.63 | 4.3 | — |
| Comparative Example 8 | 100/— | Zinc acetate 0.001 | 30/0.2/— | — | — | V-0 | 1.57 | 4.4 | — |
| Comparative Example 9 | 100/— | Zinc stearate 0.004 | 30/—/— | — | — | V-0 | 1.69 | 3.8 | — |
| Comparative Example 10 | 100/— | Zinc benzoate 0.001 | 30/—/— | — | — | V-0 | 1.68 | 3.5 | — |
| Comparative Example 11 | 100/— | Potassium isooctanoate 0.005 | 30/—/— | — | — | V-0 | 1.45 | 2.4 | — |

TABLE 3

| | PC/ABS (parts by weight) | Metal salt (parts by weight) | GF/PTFE/PDMS (parts by weight) | Carboxylic acid (parts by weight) | Phosphoric acid ester (parts by weight) | Flame-retardancy UL-94 | Mn $10^4$ | Izod (kg-cm/cm) | HDT (°C.) |
|---|---|---|---|---|---|---|---|---|---|
| Example 17 | 100/— | Zinc acetate 0.01 | —/0.2/— | — | TPP 10 | V-0 | — | 6.8 | 106 |
| Example 18 | 90/10 | Zinc acetate 0.01 | —/0.2/— | — | TPP 10 | V-0 | — | 73 | 103 |
| Example 19 | 80/20 | Zinc acetate 0.01 | —/0.2/— | — | TPP 10 | V-0 | — | 68 | 101 |
| Example 20 | 70/30 | Zinc acetate 0.01 | —/—/1.0 | — | TPP 10 | V-1 | — | 64 | 91 |
| Example 21 | 70/30 | Zinc acetate 0.01 | —/0.2/— | — | TPP 10 | V-0 | — | 64 | 90 |
| Example 22 | 70/30 | Zinc acetate 0.01 | —/0.2/— | — | TPP 8 | V-0 | — | 78 | 98 |
| Example 23 | 70/30 | Zinc stearate 0.04 | —/0.2/— | — | TPP 10 | V-0 | — | 64 | 90 |
| Example 24 | 70/30 | Zinc propionate 0.04 | —/0.2/— | — | TPP 10 | V-0 | — | 64 | 90 |
| Example 25 | 70/30 | Zinc benzoate 0.04 | —/0.2/— | — | TPP 10 | V-0 | — | 64 | 90 |
| Comparative Example 12 | 70/30 | — | —/—/— | — | — | B | — | 84 | 121 |
| Comparative Example 13 | 70/30 | — | —/—/1.0 | — | — | B | — | 82 | 120 |
| Comparative Example 14 | 70/30 | — | —/0.2/— | — | — | B | — | 83 | 120 |
| Comparative Example 15 | 70/30 | — | —/—/— | — | TPP 10 | B | — | 61 | 88 |
| Comparative Example 16 | 70/30 | — | —/—/1.0 | — | TPP 10 | B | — | 63 | 90 |
| Comparative Example 17 | 70/30 | — | —/0.2/— | — | TPP 10 | V-1 | — | 62 | 90 |
| Comparative Example 18 | 70/30 | Zinc acetate 0.01 | —/—/— | — | — | B | — | 83 | 121 |
| Comparative Example 19 | 70/30 | Sodium sulfate 0.3 | —/0.2/— | — | TPP 10 | B | — | 60 | 89 |

What is claimed:

1. A flame-retardant resin composition comprising the following components:
   (A) 100 parts by weight of a polycarbonate resin,
   (B) from 0.0001 to 1 part by weight of a salt of a carboxylic acid with zinc,
   (C) at least one member selected from the group consisting of from 1 to 200 parts by weight of glass fibers, from 0.01 to 5 parts by weight of polytetrafluoroethylene and from 0.01 to 5 parts by weight of polydimethylsiloxane, wherein when said polydimethylsiloxane is present the flame-retardant resin further contains from 1 to 30% by weight of triphenylphosphate.

2. The flame-retardant resin composition according to claim 1, wherein the salt of a carboxylic acid with zinc is zinc acetate.

3. The flame-retardant resin composition according to claim 1, which further contains up to 3 parts by weight of a carboxylic acid and/or a carboxylic acid anhydride.

4. The flame-retardant resin composition according to claim 1, which further contains a non-polycarbonate resin in an amount of from 1 to 50 parts by weight, relative to from 50 to 99 parts by weight of the polycarbonate resin, the total amount of the two resins being 100 parts by weight.

5. The flame-retardant resin composition according to claim 4, wherein the non-polycarbonate resin is an acrylonitrile-butadiene-styrene resin.

6. The flame-retardant resin composition according to claim 4, which comprises from 60 to 95 parts by weight of a polycarbonate resin and from 5 to 40 parts by weight of an acrylonitrile-butadiene-styrene resin.

7. The flame-retardant resin composition according to claim 6, wherein the acrylonitrile-butadiene-styrene resin is a graft polymer obtained by graft-polymerizing styrene and acrylonitrile to butadiene based elastomer or a polymer blend of that graft polymer and a styrene-acrylonitrile copolymer.

8. The flame-retardant resin composition according to claim 4, wherein when said polydimethylsiloxane is not present, said flame-retardant composition further contains from 1–30% by weight of a phosphoric acid ester and/or a phosphorus acid ester.

* * * * *

UNITED STATES PATENT AND TRADEMARK OFFICE
CERTIFICATE OF CORRECTION

PATENT NO. : 5,364,899
DATED : November 15, 1994
INVENTOR(S) : Jyun WATANABE, et al.

It is certified that error appears in the above-indentified patent and that said Letters Patent is hereby corrected as shown below:

On title page, item [73], the Assignee should read:

--Denki Kagaku Kogyo Kabushiki Kaisha--

Signed and Sealed this

Twenty-fifth Day of April, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,364,899
DATED : November 15, 1994
INVENTOR(S) : Jyun WATANABE, et al.

It is certified that error appears in the above-indentified patent and that said Letters Patent is hereby corrected as shown below:

On the title page, Item [75], the second inventor's first name should read:
—Noriaki—

Also on the title page, Item [73], the Assignee should read:

—Denki Kagaku Kogyo Kabushiki Kaisha—

This certificate supersedes Certificate of Correction issued April 25, 1995.

Signed and Sealed this

Twenty-seventh Day of June, 1995

Attest:

BRUCE LEHMAN

*Attesting Officer*  *Commissioner of Patents and Trademarks*